3,113,029
BEER AND MALT BEVERAGE CONCENTRATES AND PROCESS FOR PRODUCING SAME

Miguel A. Hernandez, 355 Calle I, Vedado, Havana, Cuba
No Drawing. Filed Sept. 1, 1960, Ser. No. 53,376
Claims priority, application Cuba Sept. 3, 1959
7 Claims. (Cl. 99—78)

This invention relates to new beer and malt beverages and to a process for producing the same. It is well known that the conventional methods of manufacturing beer require extensive and costly installations, equipments, and rooms for storing the beer under preparation for one or two months under constant refrigeration, and in addition it is necessary to produce a great vloume of liquid, considering that an integral manufacture of the product is involved.

Logically, such conventional methods of manufacturing beer have many remarkable disadvantages which result in a limitation of the number of beer factories, such disadvantages including the necessity for initial capital for equipment and installations, ground area, and buildings, as well as the time that is essential between the start and the completion of each batch.

The present invention overcomes the aforesaid inconveniences by an improved process which comprises the manufacture of beer in two stages, namely (a) producing a hopped malt extract constituting a dilutable beer concentrate, and (b) adding carbonated water to the beer concentrate during the bottling operation.

The first stage (a), namely the production of the extract, may proceed with or without fermentation, malt and hops being used as essential raw materials in either case.

The production of the extract with fermentation is carried out by preparing a broth of high malt-hops concentration, to which sugar may be added. Said broth is cooked, and after cooling and filtration, beer leavening is added thereto in a suitable amount to start its fermentation at room temperature (20 to 25° C.). After the fermentation has been completed, the pH of the ferment is adjusted to a value of 3 to 3.5, by addition of an acid, such as, for instance, phosphoric acid, citric acid or another acid compatible with food, and malt caramel or the like edible coloring matter is then added. Hops or lupulin essence may be added, if desired, to impart flavor thereto. The density of the liquid is increased by the addition of an edible thickener such as pectin, glucose or the like. Salt, i.e. sodium chloride, for flavoring is added; bitterness is imparted to the liquid by the addition of a bittering substance such as quinine, quassia, Angostura bitters (see "Recetario Industrial," by G. D. Hiscox and A. A. Hopkins, published by G. Gili, Barcelona, Spain (1941), page 295), or gentian. These flavoring and bittering substances are added in such amounts as to give the liquid a determined taste which is controlled by organoleptic tests. The liquid is then filtered.

Finally, the extract is strengthened by adding alcohol thereto in a sufficient amount to attain, in the final diluted alcoholic beverage, an alcoholic grade ranging between 3.5 to 7% by volume. This requires an addition of about 10 to 20% by volume of alcohol to the filtered liquid. The alcohol may also be added before the filtration takes place. There is thus obtained a fermented extract ready for storage. It is possible to preserve and store the extract in a volume equivalent to one-fifth of the volume of the final product, prior to the carrying out of the second stage.

In producing the extract without fermentation, the raw materials and process used are the same as in the previous case, only that the beer leavening added has been previously macerated in alcohol and water.

The second stage (b), namely the addition of carbonated water to the extract, is carried out by adding water and carbonic gas during the bottle filling and sealing operation. An edible foaming agent is also added either to the extract prior to storage, or, preferably, concurrently with the addition of carbonated water.

The process of this invention further comprises the manufacture of malt beverages without fermentation, which is exemplified as follows: To a syrup made with sugar and glucose is added malt extract, hops essence, lupulin, a coloring matter such as malt caramel, an acid, a foaming substance salt, and a bittering substance, and vanilla or cinnamon essence, if desired. The syrup is filtered, and the thus formed extract having a density of about 32° B. is ready to be stored and later diluted with carbonated water during the bottle filling and sealing operation. The foaming agent may also be added during the dilution step prior to bottling.

An alcohol-free malt beverage may be also produced by utilizing the fermented hopped malt extract as an ingredient, after evaporating the alcohol contained in the latter by heating to about 70 to 75° C. for a short time.

The invention affords the following advantages:
(1) A substantial saving is obtained in the manufacturing cost of the product end in general installations.
(2) The fundamental basis for the manufactured product may be produced only in a volume equal to one-fifth of the final volume.
(3) The manufacture of the product may be completed in a period of about one week.
(4) The beer produced according to this invention may be bottled in a conventional soft-drink bottling plant.

Having thus described the invention and the remarkable advantages that it offers, it should be understood that some of the described ingredients may be omitted or substituted, without thereby altering the spirit of the invention which is such as claimed hereinafter.

The invention is further illustrated but not limited by the following examples:

Example I

A broth is prepared by mixing in a fermentation vessel 2000 grams of malt
50 grams of hops
50 to 100 grams of sugar and
10 liters of water The resulting mixture is heated to boiling and maintained at boiling for about 1 hour. After cooling, 20 grams of beer leavening (yeast) are added and the fermentation mixture is left standing for about one week at a temperature of about 10 to 20° C. It is then filtered, and the clear filtrate is stored at about 5° C.

Example II 1 liter of the final liquid product (filtrate) is prepared in the same manner as described in the preceding example and diluted by adding 4 liters of carbonated water thereto. Phosphoric acid is then added to adjust the pH of the liquid to about 3.5. There are further added 1 to 2 grams of a foaming aid cactus extract, and a small amount of quinine, the amount of which is checked by organoleptic test to obtain a desired degree of bitter flavor. Ethyl alcohol is added in sufficient amounts to impart to the resulting liquid an alcohol content of 4% by volume, thus obtaining an artificial beer ready for consumption.

Example III

A broth of the same composition as that of Example I is prepared in the same manner as described in the said example, by boiling for one hour and cooling to room temperature. Separately, 5 grams of yeast (beer leavening)

are macerated in 40 grams of ethyl alcohol and 40 cc. of water, and the macerated product is added to the aforesaid broth to impart flavor to the same. The resulting malt extract can be stored and later diluted with water (4 to 5 liters per liter of extract).

*Example IV*

A broth is prepared and fermented as described in Example I. The pH of the fermented liquid is adjusted by the addition of citric acid to about 3. In addition, 3.5 grams of malt caramel per liter of broth as well as 0.5 gram of lupulin essence are added. The viscosity of the liquid is increased by adding about 10 grams of pectin per liter thereof. There are further added 2 grams of salt and 0.3 gram of Angostura bitters, and finally alcohol in amounts sufficient to raise the total alcohol content to about 15% by volume. The resulting artificial beer extract is now ready for storage. Beer having an alcohol content of about 3% by volume can be prepared from the extract by admixing the same four times its volume of carbonated water and addition of about 2 grams of the forming aid used in Example II per liter of the diluted extract.

*Example V*

A clear filtrate is prepared according to Example I. The same is then heated at a temperature of 70° C. for about 10 minutes to evaporate the small alcohol content therefrom.

There is thus obtained a storable extract, from which an alcohol-free beverage can be obtained by the further treatment described in Example II, omitting only the addition of alcohol described in the latter example.

What I claim is:

1. A process for manufacturing a storable beer concentrate dilutable to obtain a beer therefrom, which process comprises
    (a) preparing a mixture consisting essentially of mixing malt and water in the ratio by weight of about 1:5 and about 25 grams of hops;
    (b) boiling the mixture for about one hour;
    (c) adding beer leavening in the ratio of about 10 grams of leavening per kilogram of malt;
    (d) fermenting at a temperature of about 10 to 25° C. for about one week; and
    (e) filtering the resulting fermentate, thereby obtaining a fermented hopped malt extract constituting said beer concentrate.

2. A process for manufacturing a storable beer concentrate dilutable to obtain a beer therefrom, which process comprises
    (a) mixing malt and water in the ratio by weight of about 1:5 and about 25 grams of hops;
    (b) boiling the mixture for about one hour and then cooling;
    (c) adding beer leavening to the cooled mixture in the ratio of about 10 grams of leavening per kilogram of malt;
    (d) fermenting the resulting mixture at a temperature of about 10° to 25° C. for about one week;
    (e) filtering the resulting fermentate, thereby obtaining a fermented hopped malt extract;
    (f) adding to the filtered extract an edible acid to adjust the pH of said extract to about 3 to 3.5; and
    (g) adding an edible thickener to increase the density of the extract, and sodium chloride as flavoring to impart to said extract the taste of a beer.

3. A process for manufacturing a storable beer concentrate dilutable to obtain a beer therefrom, which process comprises
    (a) mixing malt and water in a ratio by weight of about 1:5, and adding thereto about 25 grams of hops and from 25 to 50 grams of sugar per kilogram of malt;
    (b) boiling the mixture for about one hour and then cooling;
    (c) adding about 10 grams of beer leavening per kilogram of malt to the cooled mixture;
    (d) fermenting the resulting mixture at a temperature of about 10° to 25° C. for about one week;
    (e) filtering the resulting fermentate, thereby obtaining a fermented hopped malt extract;
    (f) adding to the filtered extract an edible acid to adjust the pH thereof to about 3 to 3.5; and
    (g) adding an edible thickener to increase the density of the extract, and sodium chloride as flavoring to impart to said extract the taste of a beer.

4. A process for manufacturing a storable malt concentrate dilutable to obtain an alcohol-free beverage therefrom, which process comprises
    (a) mixing malt and water in the ratio by weight of about 1:5 and about 25 grams of hops;
    (b) boiling the mixture for about one hour and then cooling;
    (c) adding beer leavening to the cooled mixture in the ratio of about 10 grams of leavening per kilogram of malt;
    (d) fermenting the resulting mixture at a temperature of about 10° to 25° C. for about one week;
    (e) filtering the resulting fermentate, thereby obtaining a fermented hopped malt extract;
    (f) adding to the filtered extract an edible acid to adjust the pH thereof to about 3 to 3.5;
    (g) adding an edible thickener to increase the density of the extract, and sodium chloride as flavoring to impart to said extract the taste of a beer; and
    (h) heating the extract at about 70° to 75° C. to evaporate the alcohol contained therein.

5. A process for manufacturing a storable beer concentrate dilutable to obtain a beer having an alcohol content of about 3.5 to 15% by volume therefrom, which process comprises
    (a) mixing malt and water in the ratio by weight of about 1:5 and about 25 grams of hops;
    (b) boiling the mixture for about one hour and then cooling;
    (c) adding beer leavening to the cooled mixture in the ratio of about 10 grams of leavening per kilogram of malt;
    (d) fermenting the resulting mixture at a temperature of about 10° to 25° C. for about one week;
    (e) filtering the resulting fermentate; thereby obtaining a fermented hopped malt extract;
    (f) adding to the filtered extract an edible acid to adjust the pH thereof to about 3 to 3.5;
    (g) adding an edible thickener to increase the density of the extract, and sodium chloride as flavoring to impart to said extract the taste of a beer; and
    (h) adding ethyl alcohol in a sufficient amount to adjust the alcohol content of said extract, so that the final beer has the afore-mentioned alcohol content.

6. A process for manufacturing a storable beer concentrate dilutable to obtain a beer therefrom, which process comprises
    (a) preparing a mixture consisting essentially of malt and water in a ratio by weight of about 1:5 and about 25 grams of hops;
    (b) boiling the mixture for about one hour; and
    (c) adding an admixture of about 5 grams of yeast macerated in water-ethanol solution, whereby a non-fermented beer extract is produced.

7. A process for manufacturing a storable beer concentrate dilutable to obtain a beer therefrom, which process comprises
    (a) mixing malt and water in a ratio by weight of about 1:5, and adding thereto about 25 grams of hops and from 25 to 50 grams of sugar per kilogram of malt;
    (b) boiling the mixture for about one hour and then cooling;

(c) adding an admixture of about 5 grams of beer leavening macerated in ethanol and water, whereby a non-fermented beer extract is produced;
(d) adding to the filtered extract an edible acid to adjust the pH thereof to about 3 to 3.5; and
(e) adding an edible thickener to increase the density of the extract, and sodium chloride as flavoring to impart to said extract the taste of a beer.

References Cited in the file of this patent

UNITED STATES PATENTS

| | | |
|---|---|---|
| 168,268 | Mathews | Sept. 28, 1875 |
| 1,832,587 | Schneible | Nov. 7, 1931 |
| 2,206,719 | Praeger | July 2, 1940 |
| 2,665,213 | Hayakawa | Jan. 5, 1954 |
| 2,789,907 | Haselbach | Apr. 23, 1957 |
| 2,803,546 | Bergmann et al. | Aug. 20, 1957 |
| 2,824,803 | Stark | Feb. 25, 1958 |